United States Patent Office 3,036,217
Patented May 22, 1962

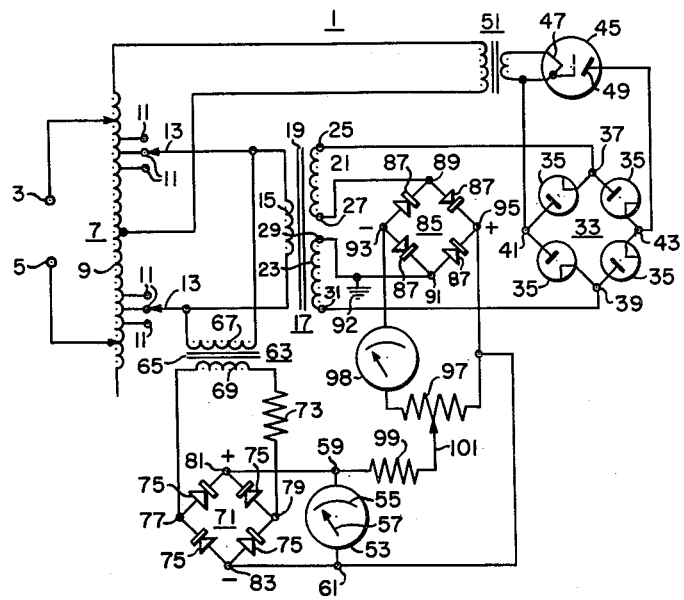

3,036,217
ELECTRICAL MEASURING SYSTEMS
Philip A. Duffy, Jr., Catonsville, Md., assignor to Westinghouse Electric Corporation, East Pittsburgh, Pa., a corporation of Pennsylvania
Filed Dec. 15, 1958, Ser. No. 780,298
9 Claims. (Cl. 250—100)

This invention relates to electrical measuring systems and has particular relation to systems for accurately measuring the voltage applied to load means energized from a source of voltage.

In certain applications, it is desirable to know the precise value of voltage applied to a load device. This is particularly true in X-ray systems wherein an X-ray tube is energized from a secondary winding of a high tension transformer. In such systems, it has previously been the practice to connect a voltmeter across the primary winding of the high tension transformer to provide an estimate of the voltage appearing across the X-ray tube. By reason of voltage drops which are developed in the secondary circuit of the high tension transformer, the voltmeter connected in the primary circuit gives an inaccurate reading of the voltage supplied to the X-ray tube even when modified by the turns ratio of the transformer.

According to the present invention, an improved system is provided for measuring the voltage applied to a load device which is energized from a source of voltage. The improved system includes an electrical measuring instrument which is connected for energization in accordance with voltage appearing at the source. Means are provided to supply an additional energization to the instrument which varies in accordance with variations of current traversing the load device. Such means are connected so that the current energization supplied thereby to the instrument acts differentially with respect to the voltage energization supplied to the instrument from the source.

This arrangement provides a measurement which varies inversely in accordance with variations in the current traversing the load device. Consequently, when the load current is increased, the response of the instrument is decreased. Inasmuch as an increase in load current causes increased voltage drops in the circuit between the source and the load device, the voltage supplied to the load is also decreased. With the differential energization of the instrument the response is an accurate portrayal of the voltage supplied to the load.

Although the invention has numerous and varied uses, it will be described in connection with X-ray systems wherein it is desired to measure the voltage applied across the X-ray tube with a high degree of accuracy. In a preferred embodiment of the invention, the measuring instrument employed is of the direct current responsive type and is connected for energization through suitable rectifying devices. The rectifying devices are connected to supply energizations to the instrument which act differentially with respect to each other. One of the rectifying devices is connected for energization in accordance with voltage appearing across the primary winding of the high tension transformer. The other rectifying device is connected for energization in accordance with the milliampere current which traverses the X-ray tube.

The measuring instrument may be of any suitable type such as an indicating or recording instrument. In a preferred embodiment of the invention, the instrument is of the indicating type including a scale which is calibrated in kilovolts. A suitable pointer may be mounted for movement with respect to the scale to provide an indication of kilovoltage. In order to permit adjustment of the voltage applied to the instrument which is derived from the milliamperage of the X-ray tube, a suitable adjustable resistance is connected in the output circuit of the associated rectifier device.

It is therefore an object of the invention to provide an improved system for measuring the voltage applied to a load device which is energized from a source of voltage.

It is another object of the invention to provide a system including a load device energized from a source of voltage with a measuring instrument connected for differential energization in accordance with voltage at the source and in accordance with load current such that the instrument response varies inversely with variations of the load current.

It is a further object of the invention to provide improved means for accurately measuring the voltage applied to an X-ray tube which is energized from a high tension transformer.

It is still another object of the invention to provide a system including an X-ray tube energized from the secondary of a high tension transformer with a direct current responsive instrument connected for differential energization through rectifier devices in accordance with voltage across the transformer primary and in accordance with milliamperage traversing the X-ray tube.

Other objects of the invention will become apparent from the following description taken in conjunction with the accompanying drawing, in which the single figure is a schematic representation of an X-ray system including means constructed in accordance with the invention for measuring voltage applied across the X-ray tube.

Referring to the drawing, there is illustrated in the single figure, an electrical system embodying the teachings of the present invention. Although the invention has numerous and varied uses, it will be described in connection with an X-ray system including an X-ray tube energized from the secondary of a high tension transformer.

The X-ray system is represented generally by the numeral 1 and includes a pair of input terminals 3 and 5 which may be connected to a suitable source of alternating current voltage. For example, the source of alternating voltage may be of the order of 220 volts having a frequency of 60 cycles per second.

The terminals 3 and 5 are connected to an autotransformer 7 including a winding 9 to which are connected a plurality of spaced taps 11. A pair of adjustable taps 13 each cooperate with a separate plurality of the taps 11 to permit adjustment of the voltage supplied by the auto-transformer 7.

The auto-transformer 7 serves to supply voltage to the primary winding 15 of a step-up, high tension transformer 17 which includes a magnetic core 19. The primary winding 15 is wound about the core 19 in inductive relation with a split secondary winding consisting of two sections 21 and 23. As illustrated, the section 21 includes spaced terminals 25 and 27, and the section 23 includes terminals 29 and 31.

The voltage induced in the sections 21 and 23 in response to energization of the primary winding 15 is supplied to a suitable rectifier 33 which is illustrated as being of the full-wave bridge type. The rectifier 33 includes a plurality of diode vacuum tubes 35 arranged in a full-wave rectifying bridge. The rectifier 33 includes further a pair of input terminals 37 and 39 which are connected respectively to the terminal 25 of the winding section 21 and to the terminal 31 of the winding section 23. The rectifier 33 also includes output terminals 41 and 43 across which appears a full-wave rectified voltage when the input terminals 37 and 39 are energized from the winding sections 21 and 23.

The rectifier 33 is connected to supply a direct current voltage to an X-ray tube 45 which may be of conventional construction. The tube 45 includes a cathode 47 and an anode 49 which are connected respectively to the output terminals 41 and 43 of the rectifier 33. A suitable transformer 51 may be connected for energization from the auto-transformer 7 to supply a heating current to the cathode 47 in the conventional manner.

In certain installations, it is desirable that the voltage applied to the tube 45 from the rectifier 33 be accurately measured. In the past, measurements of such voltage have been produced by connecting a voltmeter across the primary winding 15 of the transformer 17. By modifying the reading of the voltage by a turns ratio factor, an estimation of the voltage applied to the X-ray tube may be obtained. However, such measurement is not accurate because of the failure to take into account voltage drops produced in the secondary circuit of the transformer 17 which are caused by the flow of milliamperage current through the secondary circuit impedances. It is understood that the voltage supplied to the tube 45 is less than the voltage induced in the winding sections 21 and 23 by the amount of voltage which is dropped in the circuit portions located between the sections 21 and 23 and the X-ray tube.

In order to provide an accurate measurement of the voltage supplied to the tube 45, the present invention provides a measuring system wherein the voltage drops in the secondary circuit of the high tension transformer are taken into account. In the preferred embodiment of the invention illustrated, a measuring instrument of any suitable type is connected for differential energization in accordance with voltage appearing at the primary winding 15 and in accordance with milliamperage current traversing the secondary circuit of the high tension transformer. With this arrangement, the response of the instrument is caused to vary inversely in accordance with variations in the value of the milliamperage current.

As illustrated in the single figure, there is provided a measuring instrument 53 which is of the indicating type having an indicating scale 55 across which a suitable indicating pointer 57 is adapted to move. Preferably the instrument 53 is of the D'Arsonval direct current responsive type and includes a pair of input terminals 59 and 61 which may be connected to a suitable moving coil system (not shown).

The instrument 53 is connected for energization in accordance wtih voltage applied to the primary winding 15 of the transformer 17. For this purpose, a suitable auxiliary transformer 63 is provided including a magnetic core 65 having a primary winding 67 connected across the winding 15 of the transformer 17. The transformer 63 also includes a secondary winding 69 which is connected to supply voltage induced therein to a rectifier device 71 through a suitable impedance 73.

The rectifier 71 may be of conventional full-wave bridge type including a plurality of rectifying diodes 75 connected in a bridge arrangement. The rectifier 71 includes input terminals 77 and 79 which are connected across the secondary winding 69. When the input terminals 77 and 79 are energized, a full-wave rectified voltage appears at the output terminals 81 and 83 of the rectifier 71. The output terminals 81 and 83 have the polarity indicated and are connected respectively to the terminals 59 and 61 of the instrument 53.

According to the invention, the instrument 53 is also supplied with an energization which varies in accordance with variations of the milliamperage current traversing the secondary circuit of the transformer 17. As illustrated, a full-wave bridge type rectifier 85 is connected for energization in accordance with the milliamperage current. The rectifier 85 includes diodes 87 and input terminals 89 and 91 connected respectively to the terminals 27 and 29 of the winding sections 21 and 23. As shown, the terminals 29 and 91 are connected to a ground connection 92. When the rectifier 85 is energized, a full-wave rectified voltage appears across the output terminals 93 and 95 and is applied across a suitable impedance illustrated as a resistor 97 which is connected in series with a suitable load current indicating instrument 98.

The present invention provides that the voltage appearing across the impedance 97 is applied to the instrument 53 differentially with respect to the voltage applied to the instrument from the rectifier 71. For this purpose, the positive terminal 95 of the rectifier 85 is connected to the terminal 61 of the instrument 53 to which the negative terminal 83 of the rectifier 71 is connected. The terminal 59 of the instrument 53, to which the positive terminal 81 of the rectifier 71 is connected, is connected to the negative terminal 93 of the rectifier 85 through an impedance 99 and an electroconductive arm 101 which is in adjustable contact with the resistor 97. By adjustment of the arm 101 relative to the resistor 97, the magnitude of voltage applied to the instrument 53 from the rectifier 85 may be varied as desired.

In operation, current derived from voltage across resistor 97 will flow through two paths. One of these paths may be traced from the right hand terminal of the resistor 97 through the terminals 61 and 59 of the instrument 53, the resistor 99, the arm 101 and back to the resistor 97. The other path may be traced from the right hand terminal of the resistor 97 through the rectifier 71, the resistor 99, the arm 101 and back to the resistor 97. The major portion of current from the rectifier 85 flows through the instrument 53 inasmuch as the voltage induced in the winding 69 of the transformer 63 serves to bias the diodes 75 of the rectifier 71 so as to oppose the flow of current from the rectifier 85 through the path including the rectifier 71. This results in a high accuracy of measurement.

With the arrangement described, currents from the rectifiers 71 and 85 flow through the instrument 53 in opposing directions. As a result, the indication provided by the pointer 57 varies inversely in accordance with variations in the milliamperage current traversing the secondary circuit of the transformer 17. For example, if the milliamperage current is increased, the indication provided by the pointer 57 will be decreased. This results in accurate measurements inasmuch as the voltage applied across the tube 45 varies inversely in accordance with voltage drops produced by milliamperage in the secondary circuit of the transformer 17.

Excellent results have been obtained by employing an instrument having a sensitivity of the order of 1000 ohms per volt, and by utilizing resistors 73, 97 and 99 having values as follows:

Resistor 73 _____ 300,000Ω
Resistor 97 _____ 1,000Ω
Resistor 99 _____ 82,000Ω

It is noted that the value of the resistor 99 is selected to be considerably greater than the resistance of the moving element of the instrument 53. With this arrangement, substantially all of the current flowing from the rectifier 71 will transverse the instrument 53 without flowing through the resistors 97 and 99 thereby resulting in a highly accurate measurement.

Although the invention has been described with reference to certain specific embodiments thereof, numerous modifications are possible and it is desired to cover all modifications falling within the scope of the invention.

I claim as my invention:

1. In an electrical ssytem, a source of voltage, circuit means including load means connected for energization from said source, said source establishing current which traverses said circuit means to produce a voltage drop, a direct current responsive voltage calibrated measuring instrument for measuring the voltage applied to said load means, first rectifier means connected for energization in accordance with voltage at said source, and second rectifier means connected for energization in accordance with said current, said instrument being connected for differential energization in accordance with output voltages produced by said first and second rectifier means.

2. In an electrical system, a source of voltage, circuit means including load means connected for energization from said source, said source establishing current which traverses said circuit means to produce a voltage drop, a direct current measuring instrument having a pair of input terminals, first rectifier means having first input terminals connected for energization in accordance with voltage at said source and first output terminals, second rectifier means having second input terminals connected for energization in accordance with said current and second output terminals, impedance means connected across said second output terminals, an electroconductive arm in adjustable contact with said impedance means, one of said instrument terminals being connected to one of said first output terminals and to one of said second output terminals having polarity opposed to that of said one of said first output terminals, the other of said instrument terminals being connected to the other of said first output terminals and to said electroconductive arm.

3. In an electrical system, transformer means including first winding means connected for energization in accordance with a first alternating voltage, and second winding means inductively related with said first winding means, load means connected for energization in accordance with voltage induced in said second winding means in response to energization of said first winding means, a direct current responsive, voltage calibrated measuring instrument for measuring the voltage applied to said load means, first rectifier means connected for energization in accordance with said first voltage, and second rectifier means connected for energization in accordance with current traversing said load means, said instrument being connected for differential energization in accordance with output voltages produced by said first and second rectifier means.

4. In an electrical system, transformer means including first winding means connected for energization in accordance with a first alternating voltage, and second winding means inductively related with said first winding means, load means connected for energization in accordance with voltage induced in said second winding means in response to energization of said first winding means, a direct current measuring instrument having a pair of input terminals, first rectifier means having first input terminals connected for energization in accordance with said first voltage, and first output terminals, second rectifier means having second input terminals connected for energization in accordance with said current, and second output terminals, impedance means connected across said second output terminals, an electroconductive arm in adjustable contact with said impedance means, one of said instrument terminals being connected to one of said first output terminals and to one of said second output terminals having polarity opposed to that of said one of said first output terminals, the other of said instrument terminals being connected to the other of said first output terminals and to said electroconductive arm.

5. In an electrical system, a voltage step-up transformer including primary winding means connected for energization in accordance with a first alternating voltage, and secondary winding means, an X-ray tube connected for energization in accordance with voltage induced in said secondary winding means in response to energization of said primary winding means, an additional transformer including additional primary winding means connected to said first-named primary winding means for energization in accordance with said first voltage, and additional secondary winding means, first rectifier means connected for energization in accordance with voltage induced in said additional secondary winding means in response to energization of said additional primary winding means, second rectifier means connected for energization in accordance with current traversing said tube, and a direct current responsive measuring instrument connected for differential energization in accordance with output voltages produced by said first and second rectifier means.

6. In an electrical system, a voltage step-up transformer including primary winding means connected for energization in accordance with a first alternating voltage, and secondary winding means, an X-ray tube connected for energization in accordance with voltage induced in said secondary winding means in response to energization of said primary winding means, an additional transformer including additional primary winding means connected to said first-named primary winding means for energization in accordance with said first voltage, and additional secondary winding means, first rectifier means having first input terminals connected for energization in accordance with voltage induced in said additional secondary winding means in response to energization of said additional primary winding means, and first output terminals, second rectifier means having second input terminals connected for energization in accordance with current traversing said tube, and second output terminals, a direct current measuring instrument having a pair of input terminals, impedance means connected across said second output terminals, and an electroconductive arm in adjustable contact with said impedance means, one of said instrument terminals being connected to one of said first output terminals and to one of said second output terminals having polarity opposed to that of said one of said first output terminals, the other of said instrument terminals being connected to the other of said first output terminals and to said electroconductive arm.

7. In an electrical system, a voltage step-up transformer including primary winding means connected for energization in accordance with a first alternating voltage, and secondary winding means, an X-ray tube connected for energization in accordance with voltage induced in said secondary winding means in response to energization of said primary winding means, an additional transformer including additional primary winding means connected to said first-named primary winding means for energization in accordance with said first voltage, and additional secondary winding means, first rectifier means having first input terminals connected for energization in accordance with voltage induced in said additional secondary winding means in response to energization of said additional primary winding means, and first output terimnals, second rectifier means having second input terminals connected for energization in accordance with current traversing said tube, and second output terminals, a direct current measuring instrument having a pair of input terminals, said instrument being of the indicating type and having a scale calibrated in kilovolts, impedance means connected across said second output terminals, an electroconductive arm in adjustable contact with said impedance means, one of said instrument terminals being connected to one of said first output terminals and to one of said second output terminals having polarity opposed to that of said one of said first output terminals, the other of said instrument terminals being connected to the other of said first output terminals and to said electroconductive arm.

8. In an electrical system, a voltage step-up transformer including primary winding means connected for energization in accordance with a first alternating voltage, and secondary winding means comprising a split secondary winding having two winding sections each with an inner terminal, an X-ray tube connected for energization in accordance with voltage induced in said secondary winding means in response to energization of said primary winding means, an additional transformer including additional primary winding means connected to said first-named primary winding means for energization in accordance with said first voltage, and additional secondary winding means, first rectifier means connected for energization in accordance with voltage induced in said additional secondary winding means in response to energization of said additional primary winding means, second rectifier means connected to said inner terminals for energization in accordance with current traversing said tube, and a direct current responsive measuring instrument connected for differential energization in accordance with output voltages produced by said first and second rectifier means.

9. In an electrical system, a pair of terminals adapted to be energized from a source of alternating voltage, circuit means including load means connected for energization from said source, said source establishing load current which traverses said circuit means to produce a voltage drop, a direct current responsive measuring instrument for measuring an electrical quantity applied to said load means, first and second rectifier means, first and second and third impedance elements, network means connecting said first impedance element and said second rectifier means in circuit with said load current, means including said second impedance element connecting said instrument to said network means for energization of said instrument with a first rectified electrical quantity derived as a consequence of the flow of said load current, and means including said first rectifier means and said third impedance element connecting said instrument to said voltage terminals for energization of said instrument with a second rectified electrical quantity derived as a consequence of the magnitude of the voltage at said terminals, said first and second derived rectified quantities being applied to said instrument in opposite polarity to differentially energize said instrument.

References Cited in the file of this patent

UNITED STATES PATENTS

| | | |
|---|---|---|
| 1,707,773 | Sarfert | Apr. 22, 1929 |
| 2,098,275 | Cassen | Nov. 9, 1937 |
| 2,189,894 | Goldfield et al. | Feb. 13, 1940 |
| 2,492,343 | Zavales | Dec. 27, 1949 |